United States Patent [19]
Pearne

[11] 3,758,253
[45] Sept. 11, 1973

[54] CLAY PIPE FITTING MOLDING APPARATUS

[75] Inventor: Frank S. Pearne, San Gabriel, Calif.

[73] Assignee: Aircraft Mechanics, Inc., Los Angeles, Calif.

[22] Filed: Dec. 13, 1971

[21] Appl. No.: 207,315

Related U.S. Application Data

[63] Continuation-in-part of Ser. No. 27,045, April 9, 1970, abandoned.

[52] U.S. Cl. .............................. 425/249, 425/325
[51] Int. Cl. ........................... B28b 7/14, B28b 7/18
[58] Field of Search .................. 425/163, 164, 195, 425/249, 325, 394

[56] References Cited
UNITED STATES PATENTS

| | | | |
|---|---|---|---|
| 2,497,724 | 2/1950 | Gilson et al. | 425/309 |
| 2,706,319 | 4/1955 | Lacy et al. | 425/163 |
| 2,795,027 | 6/1955 | Rossier | 425/164 |
| 3,214,505 | 10/1965 | Pierkowski et al. | 425/394 X |
| 3,495,308 | 2/1970 | Schulze | 425/195 |

FOREIGN PATENTS OR APPLICATIONS

| | | | |
|---|---|---|---|
| 1,177,057 | 8/1964 | Germany | 425/195 |
| 27,917 | 9/1970 | Japan | 425/325 |

*Primary Examiner*—R. Spencer Annear
*Attorney*—Harold F. McNenny et al.

[57] ABSTRACT

This invention provides apparatus for molding clay pipe fittings that connect intersecting conduits. The apparatus comprises a female mold that only partially defines the exterior of a plurality of angularly intersecting conduit branches, both having bell ends formed in contiguous terminal sockets of the mold that are encompassed by a single, large, mold opening. A corresponding plurality of retractable assemblies are respectively mounted for retractable movement axially through the sockets and into the mold to dispose core bodies in intersecting relationship therein in spaced relationship with the mold walls and closing the large mold opening for more completely defining the fitting. Each retractable assembly includes a plug for mold-closing coaction with the corresponding mold socket when the plug member is so positioned in the mold. Clay forced into the closed mold about the core members forms all but a spigot end portion of one conduit branch of the fitting to be molded. Continued feeding of clay into the mold completes the molding of the fitting by extrusion of that spigot end portion of one conduit branch while moving the fitting partially out of the mold. All but one of the plug members is withdrawn from the molded fitting before, during, or after completing the fitting by extrusion and moving it entirely out of the mold. Thereafter, the molded fitting is stripped from that one plug member.

17 Claims, 10 Drawing Figures

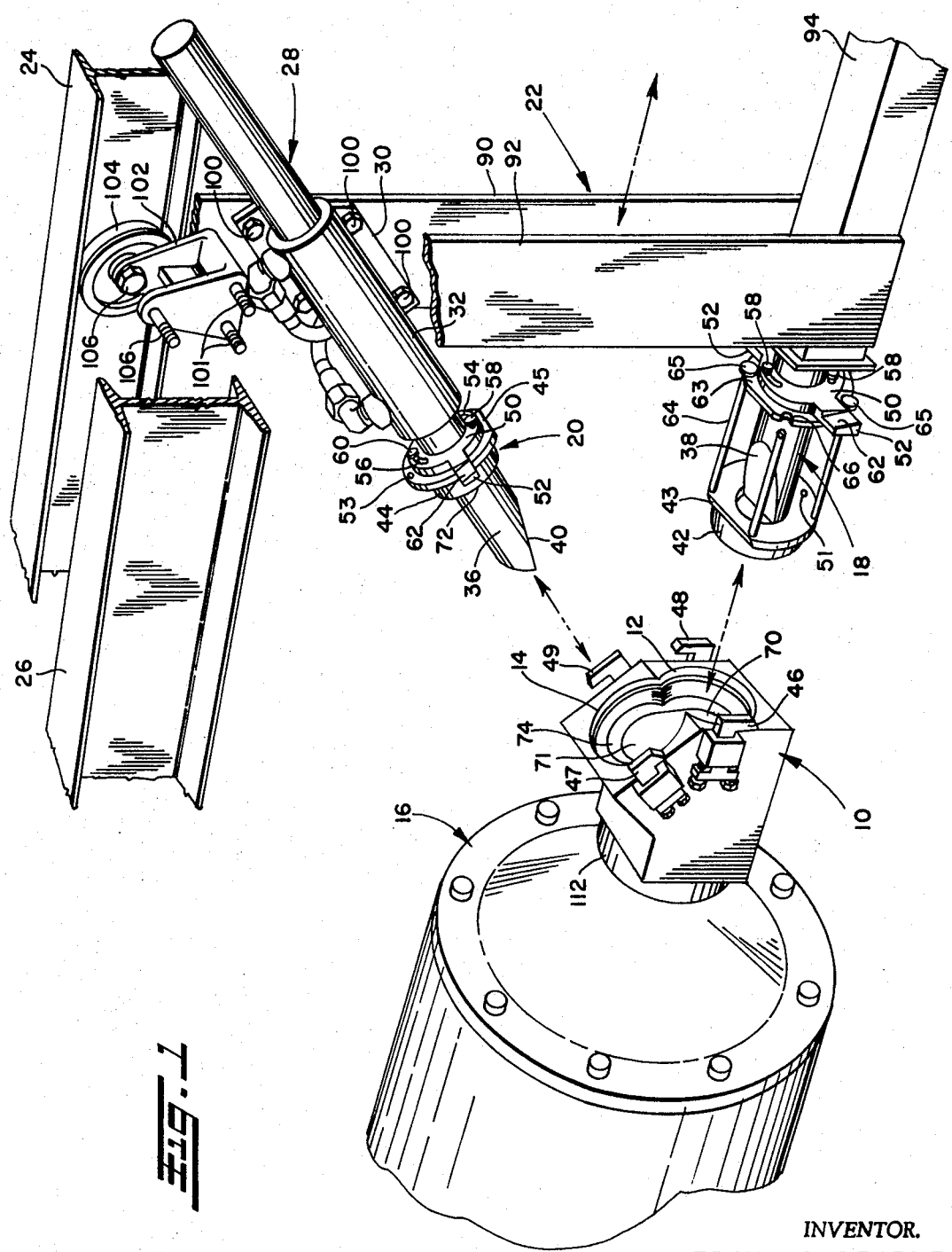

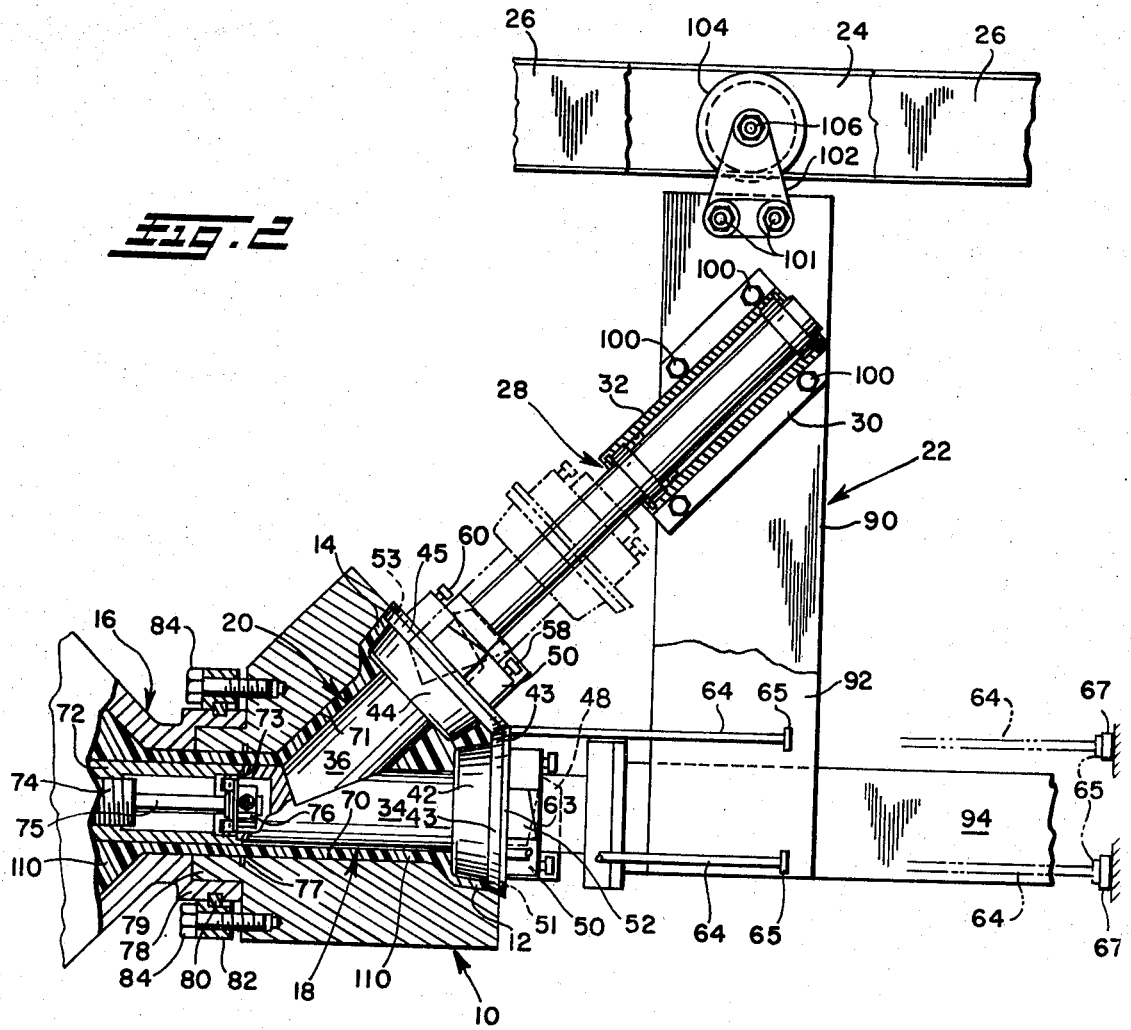
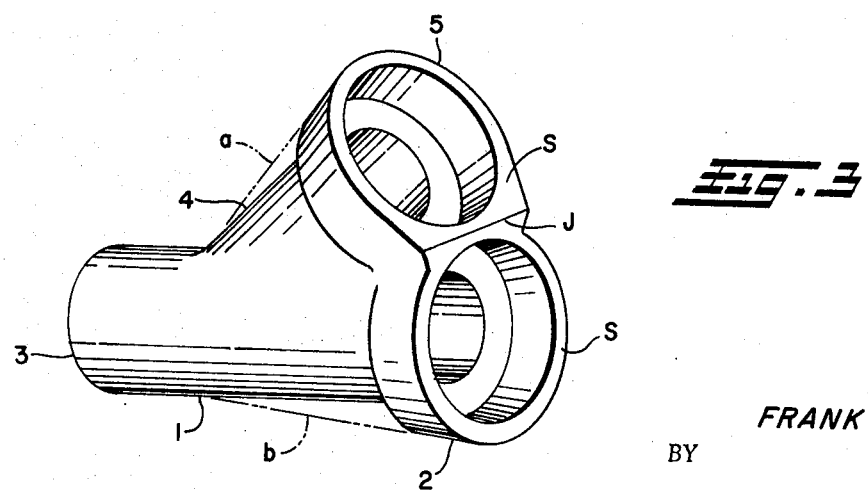
INVENTOR.
FRANK S. PEARNE

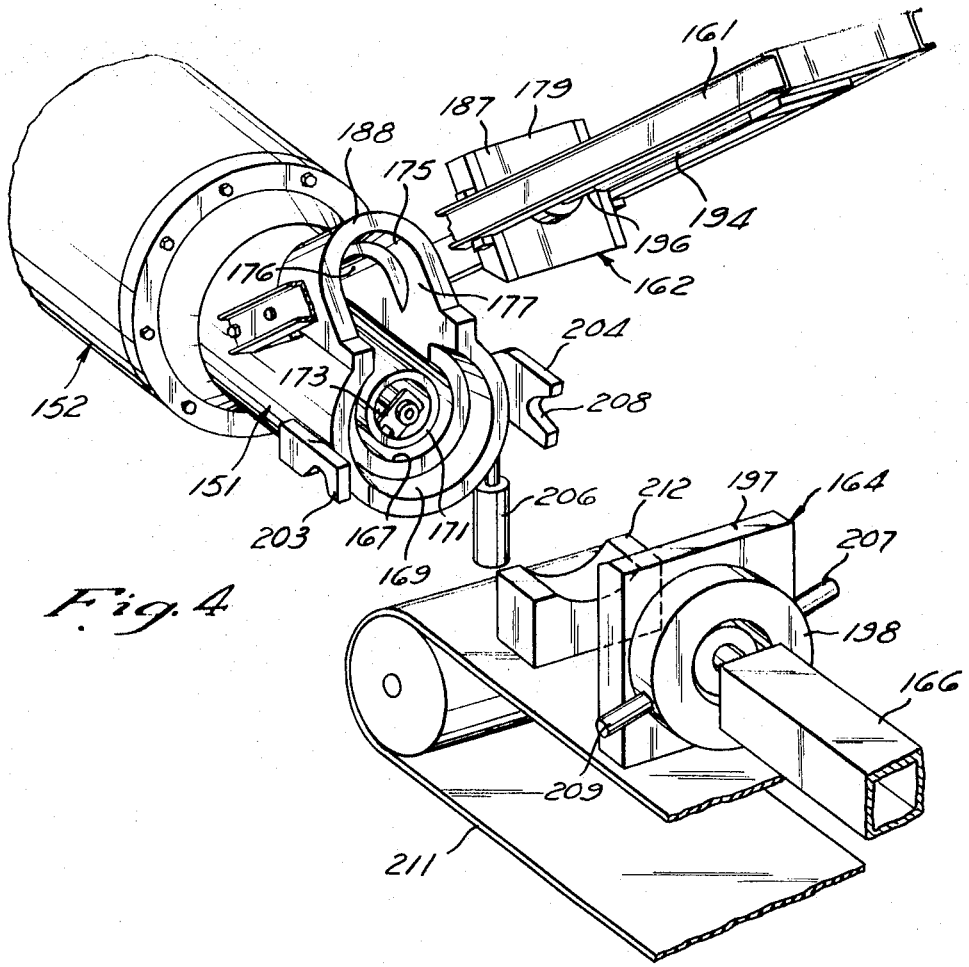
Fig. 4
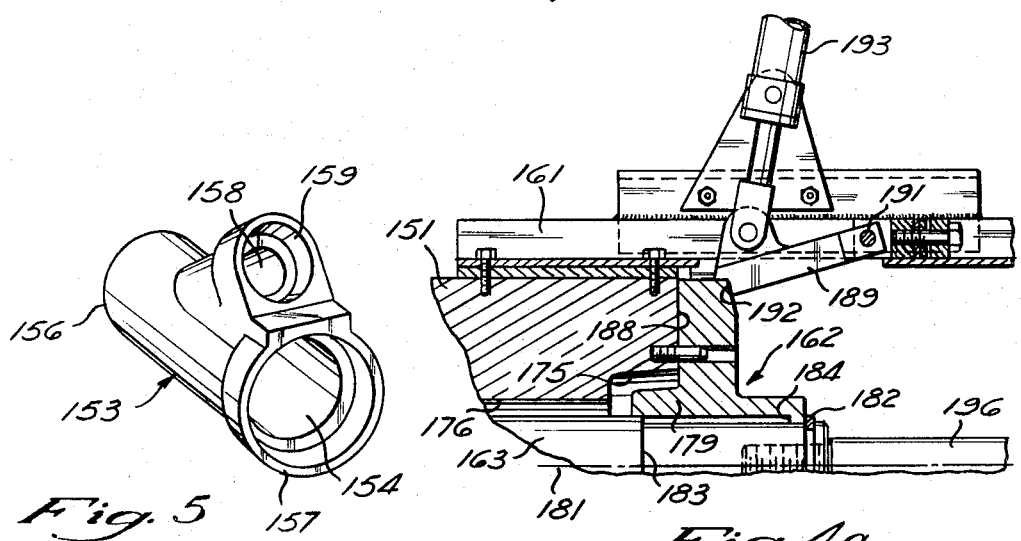
Fig. 5
Fig. 4a

CLAY PIPE FITTING MOLDING APPARATUS

BACKGROUND OF THE INVENTION AND PRIOR ART

This is a continuation-in-part of my copending U.S. Pat. application, Ser. No. 27,045, filed Apr. 9, 1970 now abandoned.

U.S. Pat. Nos. 2,795,027 and 2,795,028 are directed to a machine for making clay pipe and a method for making clay pipe, respectively. These patents disclose equipment and apparatus for the extrusion of straight, tubular, clay pipe sections of the bell and spigot type. The apparatus of the present invention is adapted for accessory coaction with clay mixing and extrusion equipment of the type shown in the foregoing patents to form multi-branch fittings for use with such straight pipe sections in the construction of pipe lines. These fittings may include tees, wyes, double wyes, and the like.

The disclosure of the foregoing patents are, therefore, incorporated herein by reference thereto. Particular reference is made to the disclosure therein of clay blending and feeding apparatus and knife means for severing extruded sections.

BRIEF STATEMENT OF THE INVENTION

Broadly stated, the present invention provides a method and apparatus for forming fittings in which a female mold is mounted on a conventional clay extruder. The mold partially defines a fitting body that includes a plurality of conduit branches, e.g., two, three, or more, each having a belled end formed by a socket in the mold. The branches may be angularly related as desired. In one illustrated embodiment, a corresponding plurality of core members, each including a core body having a socket-closing plug portion, are mounted on a carriage for retractable movement, respectively, axially through the sockets and into the mold with the plugs closing the sockets and the core bodies disposed in intersecting relation within the mold and spaced from the walls thereof. The plugs are provided with latches for respectively locking them in their socket-closing positions during initial clay extrusion to fill the mold, after which the plug latches are released and the extrusion of a trailing leg of the fitting is completed while forcing the fitting, one or more of the core members, and the carriage to move partially out of or away from the mold. All but one of the members are withdrawn as desired after they are unlatched, and the fitting is finally stripped off of the last core member. The mold and core members may be designed and related, with suitable apparatus for withdrawing the core members in a desired order from the molded fitting, to produce any of a variety of tee and wye fittings.

In another illustrated embodiment, a socket forming plug portion and associated core are mounted directly on the female mold for retraction from the fitting before the fitting is withdrawn. Further, the entire core forming the main fitting passage or conduit is provided within the female mold and is not retracted with the associated bell forming plug.

In both embodiments, the structure is arranged so that the clay is supplied to the mold cavity at the spigot end and the fitting is withdrawn from the mold by movement away from such end in the direction of the main conduit or passage. Further, both embodiments provide a structure in which all portions of the mold cavity on the side of the branch passage fitting walls in the direction of the fitting withdrawal are provided by retractable mold assemblies.

BRIEF DESCRIPTION OF THE DRAWINGS

In the annexed drawings:

FIG. 1 is a partially cut away perspective illustration of an apparatus of the present invention associated with a conventional type of clay feeder for molding a 45° wye fitting and including a female mold, a pair of retractable mold-closing core member assemblies in their retracted positions, and means for manipulating the core members;

FIG. 2 is a fragmentary cross-sectional view of the apparatus of FIG. 1 and shows details of construction of the female mold, with the core members and associated manipulating means in the mold-closing positions for initiating the mold operation;

FIG. 3 is an illustration in perspective of a 45° wye as formed by the apparatus of this invention;

FIG. 4 is a partially cut away, perspective illustration in accordance with a second embodiment of this invention where the apparatus is again arranged to mold a 45° wye fitting and again includes a female mold and a pair of retractable mold-closing assemblies with such assemblies illustrated in a retracted position;

FIG. 4a is an enlarged fragmentary section illustrating the structure of the branch-forming plug assembly;

FIG. 5 is a perspective view of the fitting manufactured by the apparatus of the second embodiment;

DETAILED DESCRIPTION OF THE INVENTION

APPARATUS OF EMBODIMENT OF FIGS. 1 THROUGH 3

Figure 6:
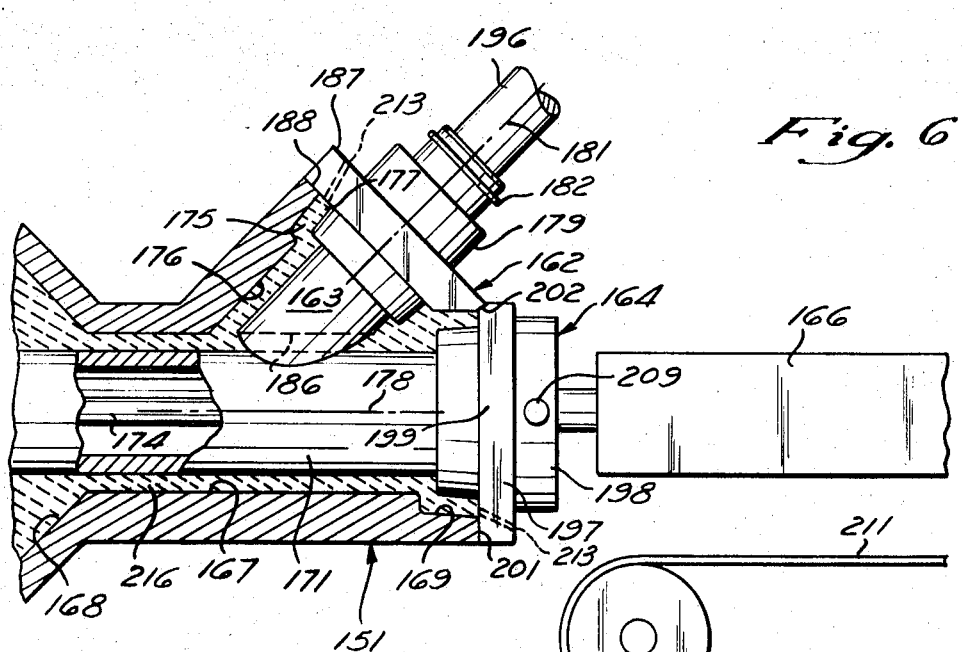
FIG. 6 is a fragmentary cross sectional view of the apparatus illustrating the mold assemblies in the initial closed position with the mold filled with clay.

Referring now to the particular embodiment of the invention shown in FIGS. 1 through 3 of the drawings, an illustrative wye fitting to be manufactured in accordance with the invention (FIG. 3) may comprise a main conduit 1 having a bell end 2 at one end thereof and an opposite spigot end 3, and having a communicating branch conduit 4 terminating in a bell end 5 that is contiguous with the bell 2 of the main conduit. In the illustrated fitting, the axis of the branch conduit 4 intersects the axis of the main conduit 1 at an angle of 45°.

A female mold 10 for forming such a fitting partially defines two, contiguous, bell-forming sockets 12 and 14, the faces of which lie in planes that intersect at an angle of 135° for forming a 45° wye (FIGS. 1 and 2). The female mold 10 is connected to and communicates with the discharge end of a conventional type of clay feeder, generally designated 16, for receiving clay therefrom as described further below.

A pair of angularly disposed core members, generally indicated at 18 and 20, are mounted on a movable carriage, generally indicated at 22, which is in turn supported by rails 24 and 26 for movement toward and away from the mold 10. The core member 20 is disposed at a 45° angle with respect to the core member 18 and includes an extensible supporting arm 28 secured to the carriage 22 by a mounting bracket 30 for independently retracting this core member 20 before or after moving the carriage 22 away from the mold to permit withdrawing the molded fitting from the mold and then from the core member 18.

The extensible arm 28 of the core member 20 includes a double acting hydraulic cylinder 32 for advancing and retracting the extensible arm and a male core body 36 mounted thereon as an extension thereof. The core body 36 is adapted for movement axially through the mold socket 14 into the female mold 10 and into intersecting relationship with another male core body 34 constituting an end portion of the core member 18.

The core member 18 is fixedly mounted on the carriage 22 for travel therewith to move the core body 34 axially into and out of the mold 10 through the mold socket 12. For this purpose, the core body 34 is shaped with a cut-out 38 adapted to receive a mating, terminal, insert portion 40 of the core body 36 to form a solid intersect that defines and forms the branching conduit communication within the body of the final molded product. The bell-forming ends of the two core bodies 34 and 36 respectively comprise flanged plug portions 42 and 44 that close the cooperating, bell-forming sockets 12 and 14, these plug portions being similar to the so-called "former" conventionally used in the similar molding of the bell end of a straight pipe section.

The plug portions 42 and 44 of the core bodies 34 and 36, respectively, are of generally similar construction. However, while the plug portion 44 of the branch core body 36 is constructed integrally therewith, the plug portion 42 of the core body 34 is a separate element having an axial bore surrounding the associated core body with a close fit for sliding longitudinally thereon from its position shown in FIG. 2 to its position shown in FIG. 1 for stripping the molded fitting from the core body 34 as hereinafter described.

The plug portion 42 of the core member 34 is dimensioned to be spaced from the inner surface of the mold socket 12 to define the bell end 2 of the main conduit 1 of the wye fitting when this core member is moved axially through its socket until its plug portion is seated therein. Similarly, the remainder of the core body 34 is spaced from the inner surface of the main mold bore 70 to define the wall of the main conduit 1 of the fitting over the axial extent of the mold 10. In like manner, the core body 36 and its plug portion 44 are spaced from the branch mold bore 71 and inner surface of the socket 14 to define the wall of the branch conduit 4 and the bell end 5 thereof. With both core bodies 34 and 36 and their respective plug portions 42 and 44 in position in the mold 10 and in closing relationship therewith, as shown in FIG. 2, the clay feeder 16 is operated to fill the mold around the core bodies as the initial molding step.

In order to seal the mold against the pressure of the extruded clay during this initial molding step, the mating edges of the sockets 12 and 14 and the flanges 43 and 45 of their respective core member plugs 42 and 44 are desirably correspondingly beveled as shown for precise sealing coaction. Each plug includes an air relief port 51 or 53 for the purpose mentioned below.

Separate locking means are provided for holding each core body and its plug portion positively in position in the mold 10. These locking means respectively act between the socket forming ends of the mold and the core members 18 and 20.

As shown in FIG. 1, each locking means includes a pair of oppositely directed, oppositely disposed pairs of adjustable hooks 46–48 and 47–49 mounted on the sides of the mold 10 on opposite sides of the mold sockets 12 and 14, respectively, and projecting axially outwardly therefrom. The plug portion 44 of the core member 20 is provided with a rotatable locking collar 50 having radially outwardly extending, diametrically opposed, locking arms, such as the arm 52 (the opposite arm not being shown). Rotation of the collar 50 through a few degrees of arc, as permitted by slots 54 and 56 and cooperating pins 58 and 60, enables engagement of the radially extending arms under the cooperating hooks 47 and 49, respectively. The hook-engaging surface of each locking arm 52 is beveled as shown at 62 to effect pressure of the rotatable collar against the plug flange 45 and tight sealing thereof in the mold socket 14 by a cam action of the locking arms on the hooks engaged thereby.

In a similar manner, the plug portion 42 of the core member 18 is provided with another rotatable, locking collar 50 having radially extending, diametrically opposed, locking arms 52 similarly mounted for rotation through a small arc into and out of locking engagement with the cooperating hooks 46 and 48 on the mold socket 12. In this instance, however, the locking collar 50 on the core member 18 bears against a pressure plate 63 that is separable from the flange 43 of the slidable plug portion 42. As shown in FIG. 1, upper and lower pairs of actuating rods 64, each having a stop flange 65 on its free end, are connected to the flange 43 of the plug portion 42 at four points adjacent and spaced about its periphery. These actuating rods extend through and beyond respectively aligned peripheral notches 66 provided in the pressure plate 63 for a distance somewhat less than the length of the core body 34 so as to engage their flanged ends 65 against upper and lower pairs of abutments 67 (FIG. 2) in the course of withdrawing the core member assembly on the carriage 22 away from the mold 10. Continued travel of the carriage 22 after such engagement causes the actuating rods to move the plug portion 42 along its core body 34 from its position thereon shown in FIG. 2 to its position thereon shown in FIG. 1 for stripping the molded fitting from the core body 34 as hereinafter described. The abutments 67 are fixedly mounted at proper locations for this purpose on any suitable, stationary, frame member of the machine (not shown). The actuating rod flanges engage the pressure plate 63 to stop this movement of the plug portion 42 before it slides off the end of its core body 34.

Upon reverse movement of the carriage 22 (with the extensible arm 28 of the core member 36 retracted as shown in FIG. 1), the core body 34 is moved along its axis and inserted axially into the bore 70 of the mold 10 through the socket 12 thereof. In the course of this movement, the plug portion 42 of the core body 34 moves into the socket 12 and is slid along the core body 34 as the latter continues to move into the mold until these parts are disposed in their relative coacting relationships shown in FIG. 2 with the associated pressure plate 63 urged against the associated plug 42. Thereupon, the above described locking mechanism is actuated to lock these parts in position in the mold as described.

With the core member 18 thus positioned, the distal end of its core body 34 engages the end of a conventional, hollow, feeder core member 72 that is axially disposed in a fixed position in the clay feeder 16. To insure proper alignment of these engaged core members, and for another purpose to be described, the distal end of the core body 34 is formed with a hollow, externally reduced and tapered, end portion 73 which engages and seats in a mating counterbore in the end of the feeder core member 72. The core body 34 and the feeder core member 72 thus form a continuous core within the closed mold body 10 for initially defining most of the length of the bore of the main conduit 1 of the wye fitting.

The aforementioned feeder core member 72 is disposed to extend axially within the feeder 16, and a bushing 74 is threadedly mounted therein for rotatably journaling a shaft 75 having a conventional, centrifugal cutter 76 mounted thereon for rotation therewith adjacent the junction of the feeder core member 72 and the hollow end of the core body 34. This centrifugal cutter, which is operated only after partial withdrawal of the core members 18 and 20 from the mold 10, projects slightly beyond the adjacent end of the feeder core member so that a retracted knife blade thereon may be swung outwardly therefrom by centrifugal force as it rotates with the shaft 75. While rotated in its outwardly swung position, the knife blade cuts through the clay wall of the completely extruded spigot end of the wye fitting, the end of the cutter blade extending through the clay into a circumferential groove 77 of the main conduit bore 70 of the mold 10 to insure cutting completely through the clay without interference from the mold. While the centrifugal cutter 76 is inoperative, it projects into the above described, hollow, reduced end portion 73 of the core body 34 (FIG. 2). The centrifugal cutter 76, its relationship to its surrounding parts, and its mode of operation all being conventional, they need not be shown or described in more detail herein.

The remainder of the clay feeding device 16 may be generally the same as the clay feeding device shown in FIGS. 1, 2, and 11 of the aforementioned U.S. Pat Nos. 2,795,027 and 2,795,028, suitably modified at the discharge end thereof for mounting the kind of mold required in accordance with the present invention. The mold 10 is provided with a cylindrical end flange 79 that is rigidly seated in a mating counterbore of the feeder throat structure 78. The mold may be firmly held in place by a clamping assembly comprising a circumferential, split ring 80 seated in a groove about the throat structure, a coacting circumferential collar 82, and a plurality of circumferentially spaced bolts 84 projecting through the collar 82 and threaded into the mold 10.

When the core member 18 has been moved into the mold 10 and locked into position as described above, the core member 20 is then in coaxial alignment with the branch conduit bore 71 of the mold. Thus, by the application of fluid pressure to the hydraulic cylinder 32, the extensible arm 28 of the core member 20 may be extended to move this core member along its axis and axially into the aligned portion of the mold through the socket 14 thereof. This brings the two core bodies 34 and 36 into engagement as shown in FIG. 2 for defining the intersect of the main and branch conduit portions 1 and 4 of the wye fitting.

The carriage 22 for supporting and moving the core member assemblies as described above may suitably comprise a pair of spaced, parallel, frame plates 90 and 92 having their lower ends straddling and secured to an actuating arm 94 to which the core member 18 is rigidly affixed. This actuating arm 94 may be powered to reciprocate longitudinally according to a predetermined sequence of movements in essentially the same manner disclosed for its functional counterpart (commonly called a "scale rod" in this art) disclosed in the aforementioned U.S. Pat. Nos. 2,795,027 and 2,795,028.

The extensible arm 28 for the core member 20 is secured to frame plate 90 by means of the mounting bracket 30 and bolts 100, the cylinder 32 being suitably welded to this bracket to dispose the axes of the two male core bodies 34 and 36 in a common vertical plane and at the required 45° angle with each other. The upper ends of the carriage frame plates 90 and 92 straddle and are secured by bolts 101 to a trolley 102 having a pair of wheels 104 mounted thereon by bolts 106 for travel along the flanges of the I-beam rails 24 and 26. This structure allows for movement of the core member assembly along the rails with the axes of the core members held in vertical alignment and respectively parallel to the diverging, vertically aligned axes of the mold sockets 12 and 14.

OPERATION OF APPARATUS OF FIGS. 1 THROUGH 3

At the end of the operations of molding and removing one wye fitting in accordance with the present invention, the carriage 22 and core members 18 and 20 carried thereby are in retracted positions relative to the mold 10, with the plug portion 42 of the main conduit core body 34 slid to the end thereof, as shown in FIG. 1. To initiate the molding of the next wye fitting, the carriage 22 is moved toward the mold until the main conduit core body 34 and its plug portion 42 are seated in the mold, as previously described. The associated locking collar 50 is then rotated to engage its arms 52 with the associated hooks 46 and 48 to lock this core member in place, as shown in FIG. 2. This aligns the branch core member 20 with the axis of the branch conduit mold bore 71, and the hydraulic cylinder 32 is then actuated to insert the core member 20 into the mold until the core body 36 and plug portion 44 thereof are similarly seated therein. The locking collar 50 on the core member 20 is then rotated to engage its arms 52 with the associated hooks 47 and 49 to lock this core member in place, as also shown in FIG. 2.

When the core members 18 and 20 are thus locked in their mold-closing positions, a green clay mix 110 of conventional composition contained in the feeder 16 is extruded through the throat structure 78 thereof along and about the feeder core member 72 in the form of a cylindrical extrusion, and into the mold 10 until the space in the latter about the intersecting core members 34 and 36 has been filled with the clay mix 110, as also shown in FIG. 2. Complete filling of the mold is facilitated in a conventional manner by the abovementioned air relief port 51 through the flange 43 and pressure plate 66 of the plug 42 and by an air relief port 53 through the flange 45 of the plug 44 of core member 20. Complete filling of the mold is indicated by the expression of clay through both of the air relief ports 51 and 53.

When the mold 10 has thus been filled, the locking collars 50 on the core members 18 and 20 are reversely actuated to unlock the core members while the extrusion of clay from the feeder 16 continues so as to force the partially molded wye fitting and the core members 18 and 20 therewith partially out of the mold in the direction of the axis of the main conduit portion 1 thereof. This movement of the partially molded wye fitting and core members 18 and 20 causes corresponding movement of the carriage 22, and such movements continue until the main conduit portion 1 of the wye fitting has been extruded to the desired length terminating at the centrifugal cutter 76, whereupon the extrusion of the clay mix 110 from the feeder 16 is interrupted. The corresponding movement of the main conduit core body 34 away from the feeder core member 72 permits the centrifugal cutter to be operated by rotation of its shaft 75 for severing the then completely molded wye fitting from the clay remaining in the feeder 16.

The above-described movement of the partially molded fitting and two core members out from the mold 10 is permitted by the fact that they move out of an appropriately shaped single large opening into the mold and by the fact that an appropriate draft or taper is provided on the bell-forming wall portions of the mold, as is clearly discernible in FIG. 2. As shown both in FIG. 1 and FIG. 2, this large opening of the mold only partially defines the two branching conduits 1 and 4 and their bell ends 2 and 5 of the fitting 1 illustrated in FIG. 3. These are completely defined only when the core bodies 34 and 36 and their plug portions 42 and 44 are in place in the mold. The maximum width of molded clay in a horizontal plane through the junction line J of the two bells 2 and 5 as the fitting is viewed in FIG. 3, and in any plane parallel thereto on either side thereof, therefore, occurs at the end surfaces S of the bells, and the bell exteriors are slightly frusto-conical and taper from a maximum diameter at their end surfaces S toward the branch conduit intersection, as indicated by the projection lines a and b in FIG. 3.

At this point, or at the moment the core members are first unlatched if desired, the hydraulic cylinder 32 may be reversely actuated to withdraw the core member 20 from the branch conduit 4 of the molded wye fitting while the spigot end 3 of the wye fitting is still surrounded by the mating portion of the main conduit forming bore 70 of the mold adjacent the cutter 76. Alternatively, withdrawal of the branch conduit core member 20 may be delayed and performed at any later point prior to stripping the molded wye fitting from the main conduit core member 18 as hereinafter described.

With or without first withdrawing the branch conduit core member 20 as described above, the actuating arm 94 is positively retracted to move the carriage 22, core members 18 and 20, and molded wye fitting further away from the mold 10 until the spigot end 3 of the molded wye fitting has cleared the mold sufficiently for easy removal. At this point, the flange ends of the actuating rods 64 have closely approached or actually contacted the associated abutments 67. If not previously withdrawn, the branch conduit core member 20 is then retracted as previously described, and, in either event, powered retraction of the acutating arm 94 is continued to push the actuating rods 64 against the abutments 67 so that, during continued, powered retraction of the actuating arm 94, the plug portion 42 of the main conduit core body 34 and the molded wye fitting engaged thereby are both held against further retraction while the rest of this core body is drawn therethrough to leave only its plug portion 42 remaining in the main conduit bell 2 of the wye fitting.

Prior to this last stage of retraction of the actuating arm 94 for stripping the wye fitting from the core body 34, the wye fitting is supported from below, either manually or by any desired supporting mechanism (not shown) that is suitably actuatable for this purpose. At the conclusion of the stripping operation just described, the molded wye fitting is then moved, either manually or by such mechanism, toward the mold 10 sufficiently to withdraw the plug 42 and distal end 73 of the main conduit core body 34 from and beyond the bell end 2 of the fitting to permit transverse off-bearing movement of the completed fitting and to leave the apparatus as shown in FIG. 1, ready for repeating the molding operation as just described.

During extrusion of the spigot end portion of the wye fitting and consequent forcing of the fitting partially out of the mold and forcing initial retraction of the core members with the carriage 22, it is desirable to maintain some resistance to the continued extrusion to assure proper molding of the spigot end of the fitting. Also, it is desirable to support the belled end of the fitting to prevent sagging of the fitting as it emerges from the mold. Frictional resistance of the carriage 22 and of the mechanism connected to the actuating arm 94 for powering the retraction and reverse movement of the carriage 22 should hold the core members 18 and 20 in the molded bells of the fitting with a sufficient force to provide the required resistance to the continuing extrusion and to support the belled end of the fitting until the spigot end portion of the fitting has been extruded to the desired length and severed from the clay remaining in the feeder 16. If that frictional resistance is not sufficient for those purposes, additional resistance to retraction of the carriage 22 may be provided by the powered mechanism that drives the actuating arm 94, in the same manner that resistance to completion of the extrusion of a straight pipe section is provided in the method and apparatus of the aforementioned U.S. Pat Nos. 2,795,027 and 2,795,028.

As will be readily understood by those faimiliar with the art of molding clay pipe, the completed green clay extrusion, after removal from the apparatus on which it is molded, may be subjected to final surface finishing operations on the exterior of the spigot end 3 and on the interior of the bell ends 2 and 5 before conveying the fitting to a drying room and, ultimately, to an oven for final curing.

APPARATUS OF EMBODIMENT OF FIGS. 4 THROUGH 9

The apparatus of the second illustrated embodiment again includes a female mold assembly 151 which is mounted on a clay feeder designated generally by 152. Here again, the illustrated female mold is shaped for the production of a wye fitting 153 illustrated in FIG. 5. The fitting 153 includes a main or through conduit 154 extending from its spigot end 156 to a bell end 157.

The illustrated fitting is also provided with a branch conduit 158 which extends in an angle of 45° from the main conduit 154 to a bell end 159.

Mounted on the female mold assembly 151 is a laterally extending support frame 161 which supports a bell forming plug assembly 162 and an associated core 163. A second retractable mold assembly 164 is mounted on the end of a support tube 166 in alignment with the main passage or bore 167 in the female mold assembly 151.

The female mold includes a main bore 167 which extends from an entrance cone 168 to a bell forming opening 169. A tubular core member 171 is supported at its inner end and projects along the bore 167 to an open end 172 located within the bell forming opening 169. A centrifugal rotatable cutter 173 driven by a shaft 174 is located immediately beyond the open end 172 of the core 171 and is operable to sever the fitting at an appropriate time in the operating cycle described below.

The female mold is also formed with a laterally extending opening 175 providing a semi-cylindrical rearward wall 176 which extends at 45° with respect to the bore 167. The wall 176 extends from the bore 167 to a bell forming opening 177. The opening 177 is shaped so that it is completely free of any wall surfaces which would project inwardly toward each other in a direction parallel to the axis 178 of the bore 167 in the direction of the bell forming opening 169. Consequently, it is possible to withdraw a fitting from the female mold by movement along the axis 178 in a direction to the right as viewed in FIGS. 6 through 9.

Figure 7:
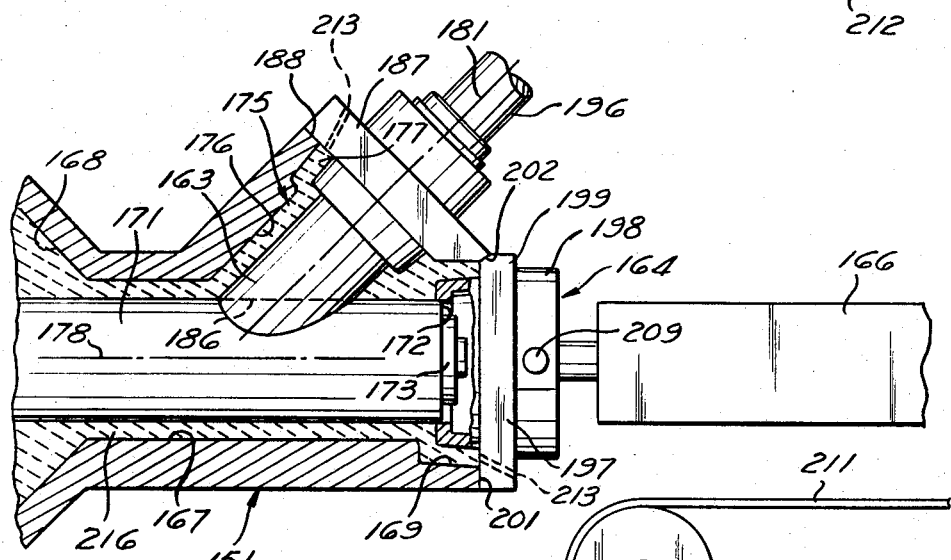
FIG. 7 is a fragmentary cross section similar to FIG. 6 but illustrating the branch core in its fully extended position which is the final position of the mold elements prior to retraction.
Figure 8:
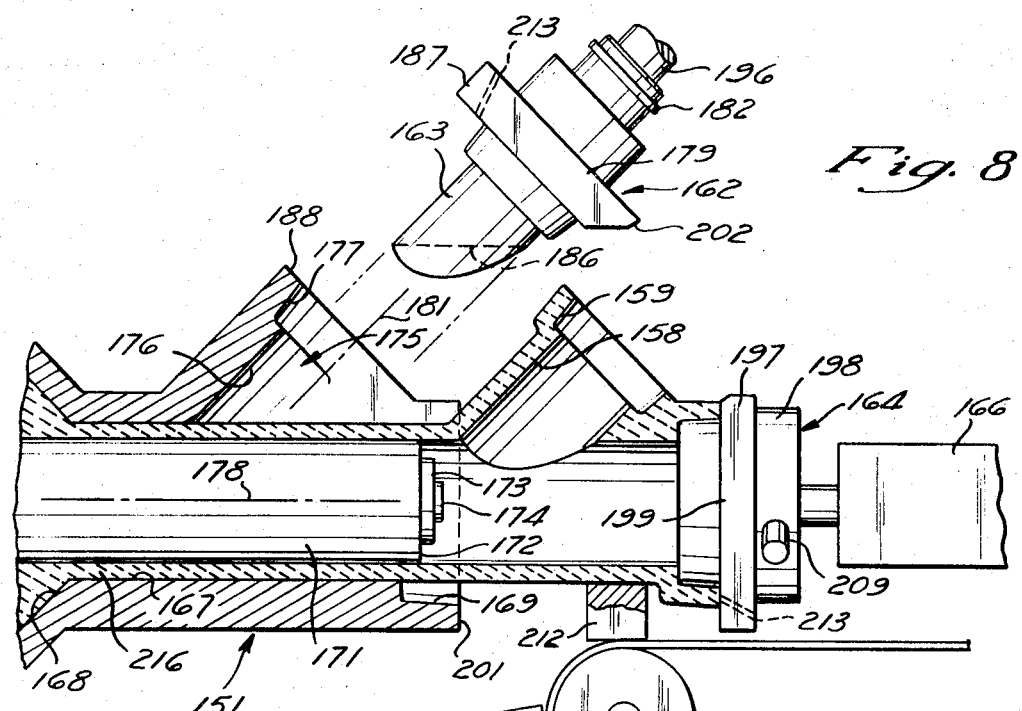
FIG. 8 is a fragmentary cross section similar to FIGS. 6 and 7 but illustrating the apparatus when the fitting is partially withdrawn from the mold but before the cutoff.

Referring to FIG. 4a, the bell forming plug assembly 162 includes a flanged plug portion 179 which is guided by the frame 161 for movement along an axis 181 which is the axis of the semi-cylindrical wall 176 and intersects the axis 178 at 45° in the illustrated embodiment. The core 163 extends through the plug for limited longitudinal movement with respect thereto. The core movement with respect to the plug 179 is limited in an extending position by a snap ring 182 and in a retracting direction by a shoulder 184 on the core which engages a mating shoulder 184 on the plug member. The forward end of the core is formed with a semi-cylindrical recess 186 which is proportioned to closely fit the cylindrical outer surface of the core 171 when the core 163 is fully extended as illustrated in FIG. 7. At such time, the snap ring 182 engages the plug 179 and causes the flanged portion 187 to engage the surface 188 of the female mold adjacent to the bell forming opening 177.

Oppositely disposed latching means illustrated in FIG. 4a are provided to releasably lock the plug 179 in the closed position of FIGS. 4a, 6 and 7. Only one latch mechanism is illustrated in FIG. 4a, but it should be understood that a similar latching mechanism is provided on the opposite side of the frame 161. Each latch mechanism includes a latch link 189 pivoted on the frame 161 at 191. The forward end of each latch link 189 is notched at 192 to fit against the back surface of the plug 179 when moved to the operative position by a piston and cylinder actuator 193. However, retraction of the piston and cylinder actuator 193 moves the associated latch 189 back to the position clear of the plug 179 to allow retraction of the plug 199 from the locked position.

The movement of the plug 179 and core 163 is controlled by a piston and cylinder actuator 194 which is supported at one end on the frame 161 and is provided with a piston 196 connected to the core 163 at its other end.

The plug assembly 164 includes a flanged plug 197 and a lock ring 198 both of which are supported by the tube 166 for movement along the axis 178 in the manner similar to the corresponding structure of the first embodiment of FIGS. 1 through 5. When in the forward or closed position best illustrated in FIG. 7, the plug 197 fits over the end of the core 171 and encloses the cutter 173. The flanged portion 199 of the plug 197 engages the face 201 of the female die and engages the surface 202 of the flanged portion 187 of the plug 179. The two plug members cooperate with the female die to close off both socket openings when they are in the closed position.

A lock mechanism, illustrated in FIG. 4, is provided to lock the plug assembly 164 in its closed position. This assembly includes a fixed latch member 203 and a pivoted latch member 204 which is operated by a piston and cylnder actuator 206. When the plug assembly 164 is moved to the closed position, an arm 207 fits into a forward-facing groove 208 on the latch member 204. Operation of the member 204 in a clockwise direction as illustrated in FIG. 4 causes the lock ring 198 to rotate until a second arm 209 fits into the latch member 203 so that the plug assembly is supported in the closed position until the actuator 206 is reversed to allow retraction of the plug assembly 164.

A powered caterpillar conveyor 211 is positioned below the dies and is provided with spaced support blocks 212 which are movable into position to support a fitting as it is withdrawn from the female die.

OPERATION OF EMBODIMENT OF FIGS. 6 THROUGH 9

Figure 9:
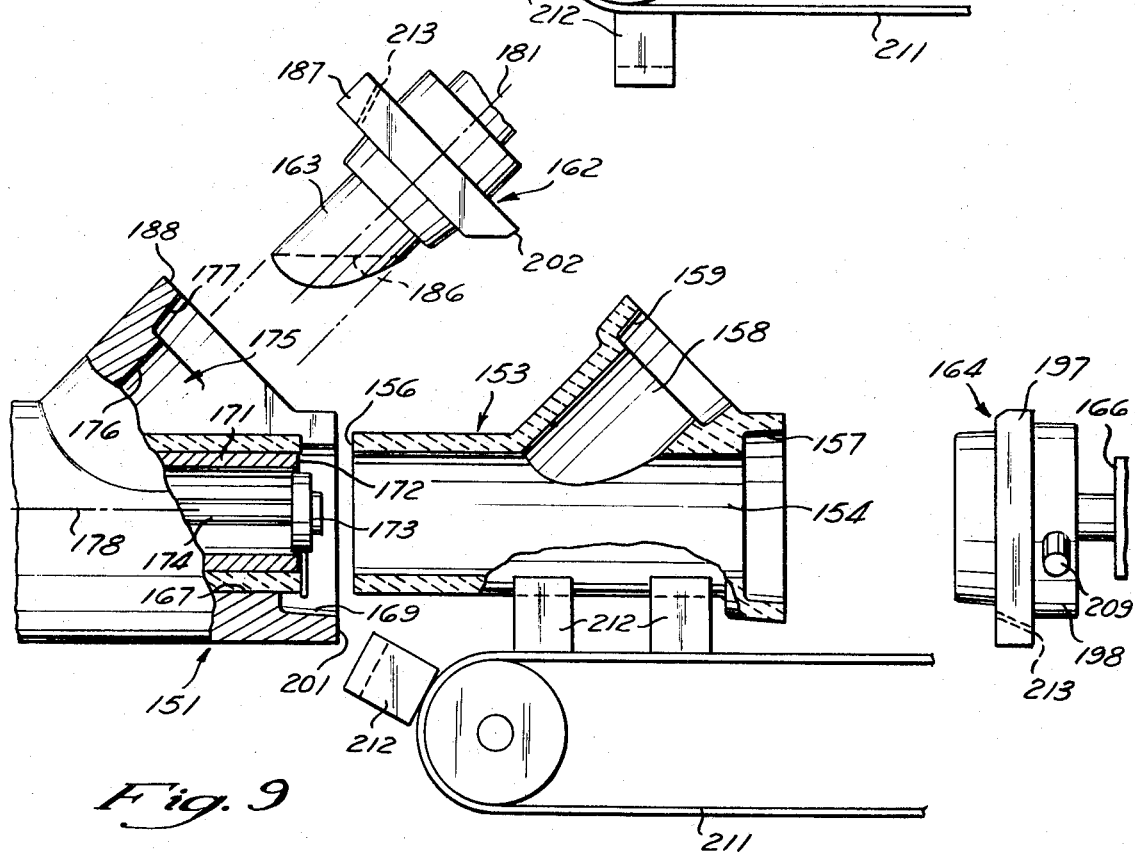
FIG. 9 is a frgmentary view similar to FIGS. 6 through 8 but illustrating the apparatus at the completion of the operation when the finished fitting is removed from the mold assemblies.

At the commencement of a cycle of operation, after a fitting has been removed and transported by off-bearing means (not illustrated) from the caterpillar conveyor 102, a tubular column of clay extends along the core 171 to the cutter 173 as illustrated in FIG. 9. After the fitting is removed, the two retractable mold assemblies are moved toward their closed position by their associated actuators. The actuator for extending the support tube 166 is not illustrated, but is preferably the same type of actuator described in connection with the first embodiment. When the plug assembly 164 is in the forward position, the actuator 206 is operated to lock the plug assembly in its closed position against the mold. As the forward end of the plug moves toward the closed position, it engages the end of the clay tube and upsets it slightly.

Operation of the actuator 191 carries the core 163 and the plug 179 down into its locked position. In the illustrated embodiment in which the core 163 moves to its fully seated position against the core 171 when the plug is carried to the fully seated position, the actuator is operated to extend fully to move the plug 171 to its seated position and the actuators 193 lock the plug in this position. During the final portion of the forward movement of the core, it expresses the adjacent clay out from between the two cores 163 and 171. After the plug 179 is locked in position, the actuator 194 is preferably retracted slightly to the position of FIG. 6 in which the semi-cylindrical end 186 is spaced back from the core 171 a distance substantially equal to the fitting wall thickness. This allows clay to extrude past the core 163 and fill the remote sections of the mold cavity without being divided as it passes the core 163.

The feeder 152 is operated while the condition of FIG. 6 exists until the mold cavity is completely filled and clay is expressed out of the weep holes 213 formed in the plugs 187 and 197, respectively, to indicate that the mold is full. The operation of the clay feeder 152 is then interrupted and the actuator 194 is operated to extend the core 163 to the extended position of FIG. 7. This further displaces clay from the mating interface between the two cores 163 and 171 and insures that complete filling of the mold cavity occurs. Any excess clay is extruded out of the weep openings. If desired, the clay feeder operation may be interrupted before the mold cavity is completely filled and the final filling of the mold cavity is completed by extension of the core 163. A thin web of clay tends to remain between the end of the core 163 and the core 171 when the core 163 is extended. Such web is removed during the finishing operations on the fitting. After the mold is filled, the locking actuators 193 are retracted to unlock the plug 162 and the actuator 194 is operated to retract the core 163 and the plug 187 to the position of FIG. 8. At the same time, the lock actuator 206 is operated to release the plug assembly 164.

After retraction of the plug assembly 162 and core 163, the clay feeder is again operated to supply additional clay to the mold through the throat 216 formed between the inner end of the bore 167 and the core 171. This causes the forward or bell end of the fitting to be moved in the direction of the axis 178. While this cocurs, the plug assembly 164 is allowed to retract but is maintained within the bell 157 to provide support.

The mold assemblies are shaped so that retraction of the lateral plug 162 and core 163 allows free movement of the lateral bell and adjacent clay wall in the direction of withdrawal. This is because all inwardly extending portions of the mold cavity on the side of the wall 176 remote from the inlet throat 216 are defined by the retractable core assemblies and because no sections of the female mold project inwardly beyond another section in the line of withdrawal movement.

As the clay feeder is operated and the plug assembly 164 is allowed to withdraw, the caterpillar conveyor is operated so that the support blocks 212 progressively engage and support the underside of the fitting.

The clay feeder is operated until the fitting has the desired length which can be substantially any length desired. After the desired length of fitting extends beyond the cutter 173, it is operated to sever the fitting as illustrated in FIG. 9 and the plug 164 is retracted clear of the adjacent end. At this time, the caterpillar conveyor continues to move the fitting until it is completely clear of the female die, after which it is removed by suitable off-bearing means. Subsequently, the cycle is repeated and a subsequent fitting is formed.

Although the method and apparatus of the present invention have been described with reference to the molding of a 45° wye fitting, it will be understood that tee fittings, double wye fittings, and the like may be similarly produced by appropriate orientation of two or more core members for coaction with an appropriately configured mold mounted on a conventional clay feeder. For this purpose, both of a pair of plug assemblies may be inclined at a desired angle to the common axis of the feeder, or one may be horizontally disposed while one or two others are disposed at any appropriate angle thereto. Thus, while the method and apparatus of the present invention have been disclosed herein with reference to a particular type of fitting and with reference to preferred apparatus and method details for forming such a fitting, it will be evident that the invention is not limited to such details and may be practiced in various ways within the scope of the appended claims.

What is claimed is:

1. An apparatus for molding clay pipe fittings that include intersecting conduit portions comprising a female mold partially defining a first bore extending therethrough from an inlet opening thereof for receiving green clay to a first partially defined outlet opening, and partially defining a second intersecting bore extending from said first bore to a second partially defined outlet opening, and a plurality of retractable mold assemblies mounted for retractable movement along respective predetermined paths through said outlet openings, said female mold completely defining a single, large opening encompassing both of said outlet openings, means for moving said retractable mold assemblies to a closed position in which they cooperate with said female mold to define said bores and said outlet openings and to close said single, large opening, and said retractable assemblies in said closed position defining a space between said outlet openings and bores for receiving clay to form a common wall separating said bores and said outlet openings, said single, large opening being shaped and disposed to permit a fitting that has been molded in the mold to be moved through said single, large opening and out of the female mold along one of said predetermined paths when said retractable assemblies are in a retracted position.

2. An apparatus for molding clay pipe fittings that include intersecting conduit portions comprising a female mold partially defining a first bore extending therethrough from an inlet opening thereof for receiving green clay to a first partially defined outlet opening, and partially defining a second intersecting bore extending from said first bore to a second partially defined outlet opening, and a plurality of retractable mold assemblies mounted for retractable movement along respective predetermined paths through said outlet openings, and retractable mold assemblies being movable to a closed position in which they cooperate with said female mold to define said bores and said outlet openings, and said retractable assemblies defining a space between said outlet openings and bores for receiving clay to form a common wall separating said bores and said outlet openings, said female mold permitting withdrawal of a fitting therefrom in the direction of said first bore away from said inlet opening, said retractable mold assemblies being mounted on a carriage that is in turn mounted for movement toward and away from said mold along one of said predetermined paths, one of said retractable mold assemblies having means associated therewith for retractably extending it relative to said carriage and along the other of said paths.

3. An apparatus for molding clay pipe fittings that include intersecting conduit portions comprising a female mold partially defining a first bore extending therethrough from an inlet opening thereof for receiving green clay to a first partially defined outlet opening, and partially defining a second intersecting bore extending from said first bore to a second partially defined outlet opening, and a plurality of retractable mold assemblies mounted for retractable movement along respective predetermined paths through said outlet openings, said retractable mold assemblies being movable to a closed position in which they cooperate with said female mold to define said bores and said outlet openings, and said retractable assemblies defining a space between said outlet openings and bores for receiving clay to form a common wall separating said bores and said outlet openings, at least one of said retractable mold assemblies including a core member mounted on a carriage that is in turn mounted for movement toward and away from said female mold along one of said predetermined paths, said female mold completely defining a single, large opening that encompasses both of said outlet openings, and said single, large opening being shaped and disposed to permit a fitting that has been molded in the female mold about the core member to be moved together with the core member through said single, large opening and out of the female mold along said one of said predetermined paths.

4. Apparatus according to claim 1 in which at least one of said retractable mold assemblies includes a core, and each retractable mold assembly includes a plug that partially defines bell molding ends of the respective bores at said outlet openings, one of said plugs being slidable along its core member.

5. Apparatus according to claim 1 in which each of said retractable mold assemblies includes a core member and a plug that partially define bell molding ends of the respective bores at said outlet openings, one of said plugs being slidable along its core member for stripping the molded fitting therefrom and including means engagable with fixed means on the apparatus for sliding said one plug along its core member to adjacent a free end thereof for effecting said stripping in response to retracting movement thereof.

6. An apparatus for molding clay pipe fittings or the like having a first conduit extending along said fitting in a predetermined direction and at least one intersecting conduit extending laterally from said first conduit comprising a clay feeder, a female mold assembly connected to said clay feeder, said female mold providing an annular throat extending in said predetermined direction through which clay is fed by said feeder into said female mold, and first and second retractable mold assemblies movable between retracted positions spaced from said female mold and closed positions in which they cooperate with said female mold to define a mold cavity shaped to form said intersecting conduit and at least part of said first conduit, said feeder being operable to feed clay through said throat to fill said cavity, said female mold being shaped to permit withdrawal of a fitting therefrom in said predetermined direction through a single, large opening defined by said female mold, said cavity including wall forming portions on the sides of adjacent walls of said intersecting conduit in said predetermined direction, said wall forming portions being defined by said retractable assemblies, retraction of said retractable assemblies permitting removal of said fitting from said assemblies through said single opening, said feeder operating to supply clay through said throat causing said fitting to move in said predetermined direction out of said female mold, and said single, large opening being shaped and disposed to permit said fitting to move through said single opening clear of its supported position within said cavity.

7. An apparatus as set forth in claim 6 in which one of said retractable mold assemblies operates to support said fitting as it is withdrawn from said female mold.

8. An apparatus as set forth in claim 6 in which one of said retractable mold assemblies includes a core operable to form said intersecting conduit and a plug operable to define at least part of a bell opening associated with said intersecting conduit, said core being extendable after said mold is substantially filled from a position spaced from said first conduit to a position intersecting said first conduit.

9. An apparatus as set forth in claim 8 in which said one retractable mold assembly is mounted for movement in a direction aligned with said intersecting conduit, and the other retractable mold assembly is mounted for movement in a direction aligned with said first conduit.

10. An apparatus for molding clay pipe fittings or the like having a first conduit extending along said fitting in a predetermined direction and at least one intersecting conduit extending laterally from said first conduit comprising a female mold assembly adapted to be used in combination with a clay feeder, and first and second retractable mold assemblies movable between a retracted position spaced from said female assembly and a closed position in which they cooperate with said female mold assembly to define a mold cavity for forming said fitting when clay is supplied thereto at one end of the portion thereof forming said first conduit, said one end portion being arranged for communication with the throat structure of a clay feeder and the continuous receipt of clay, said cavity including a first wall forming portion on the side of adjacent walls of said intersecting conduit in said predetermined direction, said first wall forming portion being defined by said retractable assemblies, said cavity also including a second wall forming portion defined by said female mold assembly conforming to the exterior of the remaining or nonadjacent walls of said intersecting and first conduits in said predetermined direction, said cavity terminating in said predetermined direction at a single, large opening defined by said female mold assembly at the adjacent ends of said conduits, retraction of said retractable assemblies permitting removal of said fitting from said cavity upon operation of a clay feeder to further supply clay to said one end portion and thereby cause movement of said fitting in said predetermined direction through said single, large opening.

11. An apparatus as set forth in claim 10 in which at least one of said retractable assemblies is operable to support one end of a fitting as such fitting is removed from said female assembly.

12. An apparatus as set forth in claim 10 in which a clay feeder is connected to supply clay thereto at said one end portion, and said fitting is withdrawn from said female mold by supplying clay through said one end portion.

13. An apparatus as set forth in claim 12 in which cutter means are provided to sever the completed fitting from the clay in said mold.

14. Apparatus for molding clay pipe fittings that include intersecting conduit portions, comprising:
  a. a green clay feeder means, including a throat structure having an outlet portion defining the outer periphery of an annular outlet opening and including a cylindrical core member disposed within said throat structure and axially thereof to a terminus adjacent said outlet opening for defining an inner periphery thereof, and means for forcing green clay through said outlet opening under pressure in the form of a cylinder;

b. a female mold connected to said feeder and defining the outer periphery of an annular, mold inlet opening registering with the outer periphery of said feeder outlet opening as a smooth continuation thereof, said mold also partially defining a first bore extending therethrough from said mold inlet opening to a first, partially defined, mold outlet opening and partially defining an intersecting bore extending from the first bore to the second, partially defined, mold outlet opening;

c. a plurality of core members adapted for retractable movement through said partially defined, mold outlet openings and into said mold in intersecting relationship therein and with portions of the core members closing said outlet openings and in coacting relationship with the mold to completely define said bores, said outlet openings, and the inner periphery of said mold inlet opening, and with one of said core members in coacting, registered, abutting relationship with said feeder core member so as to form a smooth continuation thereof; and d. a carriage for retractably moving said core members together toward said mold while moving a first one of said core members along a first predetermined path through one of said partially defined mold outlet openings and into said mold, the other of said core members being mounted on said carriage for retractable extension therefrom through the other of said partially defined, mold outlet openings and into said mold in intersecting relationship with said first core member and in the aforesaid coacting relationships with said mold and feeder core member.

15. Apparatus according to claim 14 in which said female mold defines a single, large opening encompassing and partially defining both of said mold outlet openings, said single, large opening being shaped and disposed to permit a fitting that has been molded in the mold body about the core members to be moved together with the core members through said single, large opening and out of the mold along said first predetermined path.

16. Apparatus according to claim 15 in which said core members respectively include plugs that partially define bell forming ends of the respective bores of said female mold at said outlet openings, one of said plugs being slidable along its core member for stripping therefrom a fitting molded in said mold body.

17. Apparatus according to claim 16 in which said core members respectively include plugs that partially define bell forming ends of the respective bores of said female mold at said outlet openings, one of said plugs being slidable along its core member for stripping therefrom a fitting molded in said mold and including means engagable with fixed means on the apparatus for sliding said one plug along its core member to adjacent a free end thereof for effecting said stripping in response to retracting movement thereof.

* * * * *